(12) United States Patent
Trzecieski et al.

(10) Patent No.: US 8,760,268 B2
(45) Date of Patent: Jun. 24, 2014

(54) REMOTE CONTROLLER AND RECHARGER FOR REMOTE CONTROLLING AND FOR USE IN RECHARGING OF A TOY ITEM

(75) Inventors: Michael Trzecieski, Mid Levels (HK); David Piltz, Toronto (CA)

(73) Assignee: Desk Pets International (HK) Limited, Tsim Sha Tsui East, Hong Kong (HK)

( * ) Notice: Subject to any disclaimer, the term of this patent is extended or adjusted under 35 U.S.C. 154(b) by 182 days.

(21) Appl. No.: 13/387,678

(22) PCT Filed: Jul. 27, 2010

(86) PCT No.: PCT/CA2010/001145
§ 371 (c)(1),
(2), (4) Date: Jan. 27, 2012

(87) PCT Pub. No.: WO2011/011870
PCT Pub. Date: Feb. 3, 2011

(65) Prior Publication Data
US 2012/0126956 A1 May 24, 2012

Related U.S. Application Data

(60) Provisional application No. 61/228,632, filed on Jul. 27, 2009.

(51) Int. Cl.
*G08C 19/16* (2006.01)
(52) U.S. Cl.
USPC .......................................................... 340/12.5
(58) Field of Classification Search
USPC ............ 340/12.5, 4.11, 4.42; 446/34, 35, 38; 320/158
See application file for complete search history.

(56) References Cited

U.S. PATENT DOCUMENTS

| | | | |
|---|---|---|---|
| 5,334,075 A | 8/1994 | Kakizaki et al. | 446/438 |
| 6,700,773 B1 * | 3/2004 | Adriaansen et al. | 361/679.08 |
| 6,976,210 B1 | 12/2005 | Silva et al. | 715/205 |
| 7,301,596 B1 | 11/2007 | Morganstern et al. | 349/131 |
| 8,109,802 B2 * | 2/2012 | Chui et al. | 446/36 |
| 2006/0135035 A1 | 6/2006 | Leung | 446/456 |
| 2009/0170395 A1 * | 7/2009 | Wai | 446/38 |

FOREIGN PATENT DOCUMENTS

| | | | |
|---|---|---|---|
| CN | 2476318 | 3/2001 | A63H 17/385 |
| KR | 20-0339492 | 1/2004 | |

OTHER PUBLICATIONS

Search Report from PCT application No. PCT/CA2010/001145.

* cited by examiner

*Primary Examiner* — Vernal Brown
(74) *Attorney, Agent, or Firm* — Matthew A. Pequignot; Pequignot + Myers LLC (57) ABSTRACT

A toy remote controller and recharger (TRCR) for remote controlling and for use in recharging a toy item is disclosed. The TRCR is operable in two modes of operation. In a first mode of operation, the TRCR is used for controlling a playflow of the toy item through transmitting a playflow control wireless signal from a wireless transmitter in response to input from a user. In a second mode of operation, the TRCR is used for recharging the toy item by electrical power provided from a USB port when a toy charging connector is coupled with the toy item. Optionally, embodiments of the invention also allow for the TRCR to control the playflow of the toy item when the TRCR is coupled with the USB port for receiving a playflow control data from the USB port, and the toy item is uncoupled from the toy charging connector.

20 Claims, 5 Drawing Sheets

REMOTE CONTROLLER AND RECHARGER FOR REMOTE CONTROLLING AND FOR USE IN RECHARGING OF A TOY ITEM

CROSS REFERENCE TO RELATED APPLICATION

This application is the national stage entry of International Appl. No. PCT/CA2010/001145, which claims priority to U.S. Provisional Patent Application No. 61/228,632 filed on Jul. 27, 2009. All claims of priority to these applications are hereby made, and each of these applications is hereby incorporated in its entirety by reference.

FIELD OF THE INVENTION

The field of the invention relates to toys and more specifically to a device for remote controller of a toy item and for connecting with a USB port and the toy item for recharging of the toy item.

BACKGROUND INFORMATION

There are many devices in the world that are recharged from a USB (universal serial bus) port on a personal computer (PC) or with the use of an adapter that features a USB port that provides a voltage of 5 Volts for use in recharging and powering of these devices.

In the case of toy items, there are many toy items that are provided with a remote controller, for use in controlling a play flow of the toy item. An example of play flow is controlling of the toy item in various directions, for example, forwards, backwards and left and right. Typically the remote controller that is provided with the toy item also features a battery pack inside and a cable for use in recharging of the toy item. Typically the control of the toy is wirelessly performed, using either modulated infrared light or radio waves.

An example of such a typical toy item is a remote controller (RC) helicopter. Inside the RC helicopter there is a rechargeable battery and this rechargeable battery is recharged from the remote controller by plugging the helicopter into the remote controller using the cable. Within the remote controller, there is typically a plurality of alkaline batteries disposed. Once the RC helicopter is recharged, the cable is unplugged and the item is then played with using the remote controller for controlling the play flow thereof. In other cases, a remote controller is provided with a battery box in addition to a charging cable, where the charging cable is used for recharging of the rechargeable battery inside the helicopter via the battery box. In some cases this charging cable is connected to a USB port, so that power from the USB port is provided for recharging of the battery disposed within the helicopter. In other cases, recharging of the battery disposed within the helicopter is preformed via a transformer that is coupled to AC power.

Unfortunately, such remote controllers that have a large number of alkaline batteries disposed therein are known to be bulky. As well, they require the replacing of batteries within when these batteries are depleted through recharging and remote controlling of the play flow of the toy item.

It is therefore an object of the present invention to provide a remote controller that overcomes the deficiencies of the prior art.

SUMMARY OF THE INVENTION

In accordance with the invention there is provided a remote controller and recharger for remote controlling and for use in recharging of a toy item comprising: a housing comprising an outside surface; a toy charging connector comprising a first portion disposed within the housing and a second portion extending past the outside surface; a wireless transmitter for transmitting a playflow control wireless signal past the outside surface of the housing; a retractable connector comprising at least two contacts and for extending past the outside surface of the housing in a second state, wherein in the second state the retractable connector at least two contacts are for engaging a USB port for having electrical power provided from the USB port to the at least two contacts; a user input device for at least one of extending past the outside surface of the housing and disposed within the housing for receiving input from the user; a control circuit coupled with the at least two contacts and with the toy charging connector and the wireless transmitter and the user input device, the control circuit comprising a recharging circuit, wherein in a first mode of operation the control circuit is for controlling a play flow of the toy item through transmitting the playflow control wireless signal from the wireless transmitter and in a second mode of operation the control circuit is for recharging of the toy item through electrical power provided from the USB port when the toy charging connector is coupled with the toy item and the retractable connector is in the second state.

In accordance with the invention there is provided a system comprising: a USB port; a toy item comprising a toy housing and having a toy rechargeable battery disposed within the housing and a toy charging receptacle coupled with the toy rechargeable battery and a wireless receiver for receiving of a playflow control wireless signal and coupled with a toy control circuit for controlling a play flow of the toy item in dependence upon the playflow control wireless signal; a remote controller and recharger for operating in a first mode of operation for controlling of a play flow of the toy and for in a second mode of operation for recharging of the toy, the remote controller and recharger comprising: a housing comprising an outside surface; a toy charging connector comprising a first portion disposed within the housing and a second portion extending past the outside surface; a wireless transmitter for transmitting a playflow control wireless signal past the outside surface of the housing, the playflow control wireless signal for being received by the wireless receiver; a retractable connector comprising at least two contacts and for extending past the outside surface of the housing in a second state, wherein in the second state the retractable connector at least two contacts are for engaging a USB port for having electrical power provided from the USB port to the at least two contacts; a user input device for at least one of extending past the outside surface of the housing and disposed within the housing for receiving input from the user; a control circuit coupled with the at least two contacts and with the toy charging connector and the wireless transmitter and the user input device, the control circuit comprising a recharging circuit, wherein in the first mode of operation the remote controller and recharger is for controlling the play flow of the toy item through transmitting the playflow control wireless signal from the wireless transmitter for being received by the wireless receiver and in the second mode of operation the remote controller and recharge is for recharging of the toy item toy rechargeable battery through electrical power provided from the USB port when the toy charging connector is coupled with toy charging receptacle and the retractable connector is in the second state.

In accordance with the invention there is provided a method comprising: providing a toy remote controller and recharger (TRCR) comprising a wireless transmitter coupled with a USB connector and a user input device and having a housing; coupling the TRCR with the toy item and the USB connector with a USB port; receiving of electrical power provided from the USB port; recharging of the toy item through the electrical power received from the USB port; uncoupling of the TRCR from the toy item; wirelesly transmitting a playflow control wireless signal using the wireless transmitter; receiving of the playflow control wireless signal by the toy item; and controlling a playflow of the toy item through the received playflow control wireless signal by the toy item.

BRIEF DESCRIPTION OF THE DRAWINGS

Exemplary embodiments of the invention will now be described in conjunction with the following drawings, in which.

DESCRIPTION OF EMBODIMENTS OF THE INVENTION

Figure 1A:
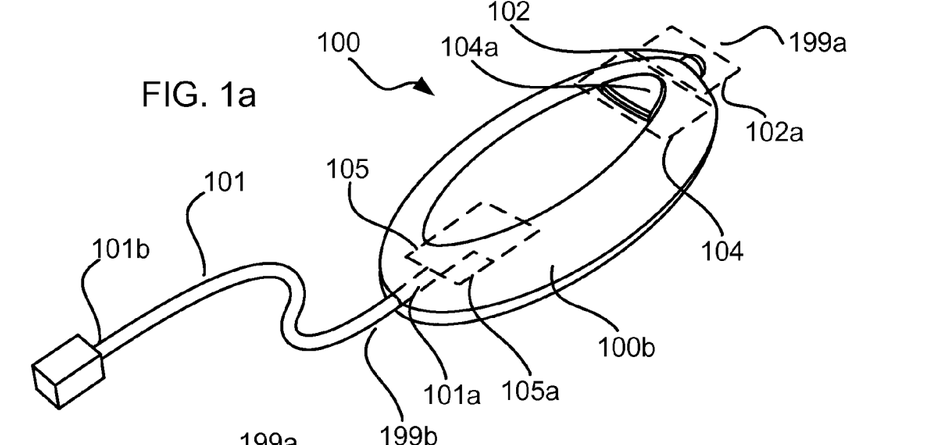
FIG. 1a illustrates a toy remote controller and recharger (TRCR), in accordance with a preferred embodiment of the invention, from a perspective view.
Figure 1B:
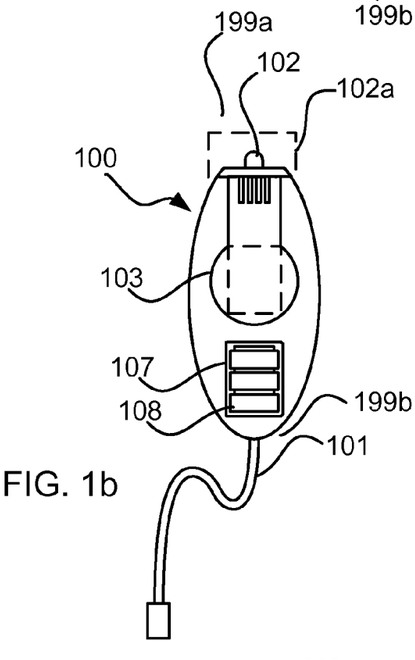
FIG. 1b illustrates the toy remote controller and recharger from a bottom view with a retractable connector in a retracted position.
Figure 1C:
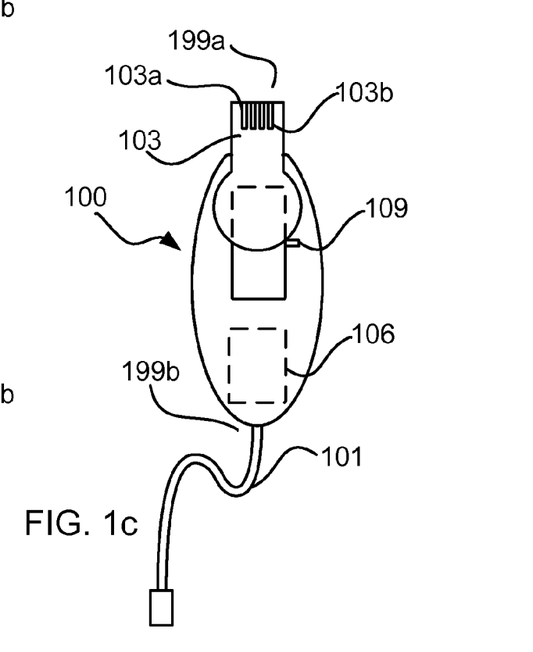
FIG. 1c illustrates the toy remote controller and recharger from a bottom view with the retractable connector in an extended position.
Figure 1D:
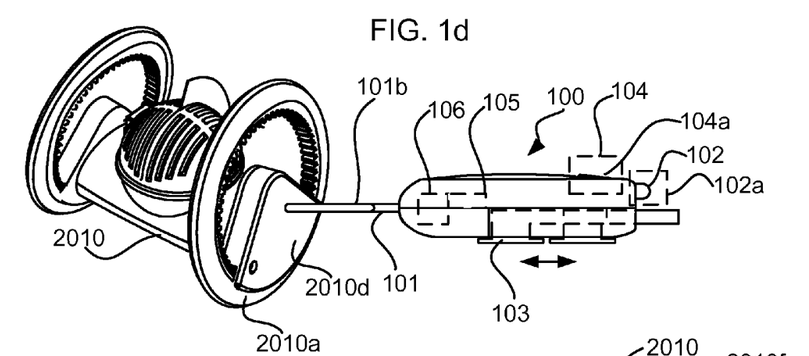
FIG. 1d illustrates the toy remote controller and recharger from a side view and coupled with a toy item.

FIGS. 1a, 1b, 1c and 1d illustrate a toy remote controller and recharger (TRCR) 100 in accordance with a first and preferred embodiment of the invention, where FIG. 1a illustrates the TRCR 100 from a perspective view, FIGS. 1b and 1c from a bottom view. FIG. 1d illustrates the TRCR 100 from a side view and coupled with a toy item 2010 having at least a wheel 2010a.

Referring to the aforementioned FIGs, the TRCR 100 is formed from a housing 100a having an outside surface 100b, a toy charging connector 101, in the form of a charging wire, comprising a first portion 101a disposed within the housing 100a and a second portion 101b extending past the outside surface 100b and a wireless transmitter 102a for transmitting a playflow control wireless signal 102b past the outside surface 100b of the housing 100a. The wireless transmitter 102a is in the form of an infrared light emitting diode (IRLED) 102, which is partially recessed within the housing 100a for emitting of modulated light past the outside surface 100b of the housing 100a, and disposed at a first end thereof 199a. Referring to FIGS. 1b and 1c, a retractable connector 103 is provided for transitioning in relation to the housing 100a between a first state and a second state, where the retractable connector 103 is extended past the outside surface of the housing (FIG. 1c) in a second state and for being retracting approximately within the housing 100a in a first state (FIG. 1b). The retractable connector 103 has formed thereon at least two contacts 103a and 103b where in the second state the retractable connector at least two contacts are for coupling with a USB port 110 (FIG. 1c for receiving of electrical power provided from the USB port 110 to the at least two contacts 103a and 103b. Preferably the retractable connector 103 is disposed proximate the first end 199a. The toy charging connector 101 is preferably disposed at a second end 199b of the housing 100a, which is opposite the first end 199a.

Figure 1E:
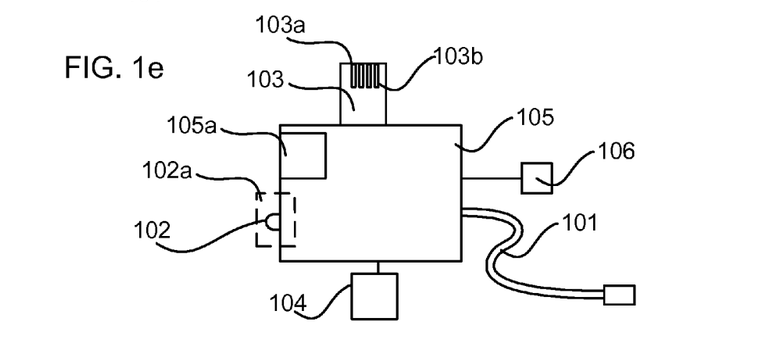
FIG. 1e illustrates a control circuit as part of the toy remote controller and recharger.

A user input device 104, in the form of at least a button 104a, is provided for receiving of input from a user when the user interacts with the user input device 104. The user input device 104 is disposed for at least one of extending past the outside surface 100b of the housing 100a and disposed within the housing 100a. Referring to FIG. 1e, the control circuit 105 is shown in detail, where the control circuit 105 is coupled with the at least two contacts 103a and 103b and with the toy charging connector 101 and the wireless transmitter 102a and the user input device 104 and a rechargeable battery 106, the control circuit 105 comprising a recharging circuit 105a, wherein in a first mode of operation the control circuit 105 is for controlling a play flow of the toy item 2010 through transmitting the playflow control wireless signal 102b from the wireless transmitter 102a (FIG. 1g) and in a second mode of operation the control circuit 105 is for recharging of the toy item 2010 (shown in FIG. 1d) through electrical power received from the USB port 110 (FIG. 1c when the toy charging connector 101 is coupled with the toy item 2010 (FIG. 1d) and the retractable connector 103 is in the second state.

Figure 1F:
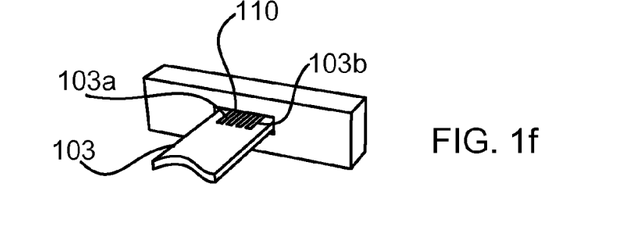
FIG. 1f illustrates the retractable connector being coupled with a USB port.
Figure 1G:
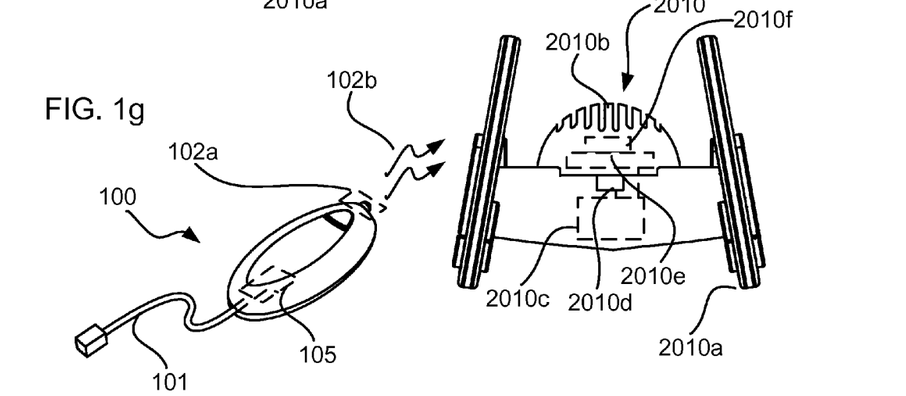
FIG. 1g illustrates the toy remote controller and recharger transmitting a playflow control wireless signal to a toy item.

Referring to FIGS. 1g and 1d, the user input device 104 also includes at least a first button 104a coupled with the control circuit 105, wherein the modulated light emitted from the IRLED 102 comprises a first set of optical signals upon pressing of the at least a first button 104a for controlling the play flow of the toy item 2010 that comprises at least a wheel 2010a. Prior to controlling the play flow of the toy item 2010 the toy item 2010 is uncoupled from the TRCR 100. Referring to FIG. 1g, in addition, the toy item 2010 includes a toy housing 2010b and a toy rechargeable battery 2010c disposed within the toy housing 2010b and a toy charging receptacle 2010d coupled with the toy rechargeable battery 2010c and a wireless receiver 2010e, for receiving of the playflow control wireless signal 102b, preferably in the form of the first set of optical signals, and coupled with a toy control circuit 2010f.

In this case the wireless receiver 2010e is preferably an optical receiver and preferably in the form of an infrared optical receiver. The toy control circuit 2010f receives the playflow control wireless signal 102b, preferably in the form of the first set of optical signals, and in response thereto controls the play flow of the toy item 2010. For example, the play flow may include, moving the toy item 2010 forward, backwards, turning left, turning right using the at least a wheel 2010a. Preferably, as the user interacts with the user input device 104, the playflow of the toy item 2010 is changed. So for example, the toy item 2010 is currently moving in a forwards direction and as a result of the user interaction with the user input device 104, the toy item then turns right.

The wireless transmitter 102a is preferably in the form of the light emitting diode 102, however a Bluetooth™ radio transmitter for emitting of radio waves is also envisaged, although the production costs associated with such a transmitter are known to be higher. Referring to the user input device 104, other technologies are also envisaged, such as, at least one of a touch sensor and a slider for sliding in relation to the housing and a variable resistor and an optical sensor and a gravity sensor, such an accelerometer, and a magnetic sensor, and a sonic sensor.

The TRCR 100 preferably comprises a rechargeable battery 106 (FIG. 1c) disposed within the housing 100a and coupled with the control circuit 105, wherein in the second mode of operation the electrical power provided from the USB port 110 is for at least one of recharging of the rechargeable battery 106 and for providing of electrical power to the control circuit 105. Optionally, the TRCR 100 comprises a battery compartment 107 disposed with the housing 100a and coupled with the control circuit, wherein, in use, in the first mode of operation the battery compartment 107 is for comprising at least a removable battery 108 disposed therein and for providing of electrical power to the control circuit 105. For example, the removable battery 108 is comprised of at least an alkaline battery, such as three AG13/LR44 button cells. If a battery compartment is provided 107 with a removable battery 108, that is non rechargeable, then in the first mode of operation the recharging circuit 105a does not recharge the removable battery 108.

Referring to FIG. 1c, the TRCR 100 also preferably comprises a releasable locking mechanism 109 coupled between the retractable connector 103 and the housing 100a, wherein the releasable locking mechanism 109 is for releasably locking the retractable connector 103 when the retractable connector 103 transitions between at least one of the first state and the second state and the second state and the first state. When the retractable connector is in the first state, preferably the releasable locking mechanism 109 provides a releasable locking function to the retractable connector 103 so that the insertion into the USB port 110 is facilitated. This releasable locking allows for the retractable connector 103 to not retract within the housing 100a when the retractable connector 103 is inserted into the USB port 110.

Figures 2A, 2B, 2C:
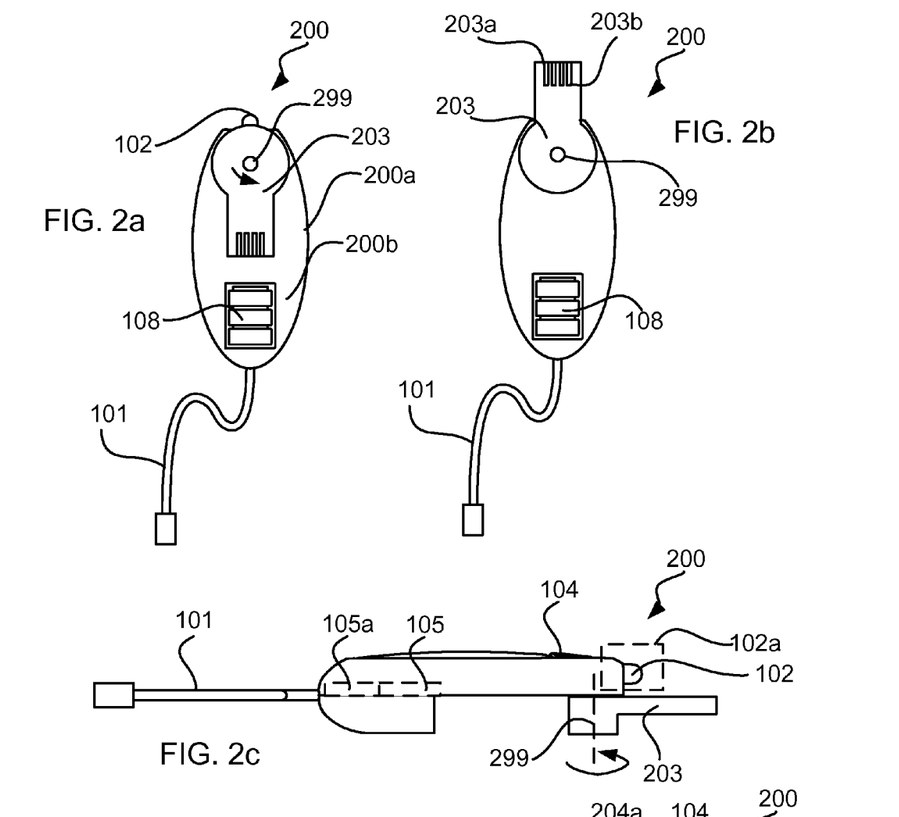
FIG. 2a illustrates a toy remote controller and recharger in accordance with a second embodiment of the invention from a bottom view with a retractable connector in a retracted position.
FIG. 2b illustrates the toy remote controller and recharger in accordance with the second embodiment of the invention with the retractable connector in an extended position.
FIG. 2c illustrate the toy remote controller and recharger in accordance with the second embodiment of the invention from a side view with the retractable connector in the extended position.

FIGS. 2a, 2b, 2c and 2d illustrate a toy remote controller and recharger (TRCR) 200 in accordance with a second embodiment of the invention. Referring to FIG. 2a, the TRCR 200 is formed from a housing 200a having an outside surface 200b. A toy charging connector 101, preferably in the form of a charging wire, has a first portion 101a disposed within the housing 200a and a second portion 101b extending past the outside surface 200b of the housing 200a. A wireless transmitter 102a, in the form of an optical transmitter and preferably in the form of an infrared light emitting diode (IRLED) 102, is recessed within the housing 200a and is for emitting the playflow control wireless signal 102b (FIG. 1g), in the form of modulated light, past the outside surface 200b of the housing 200a.

Figure 2D:
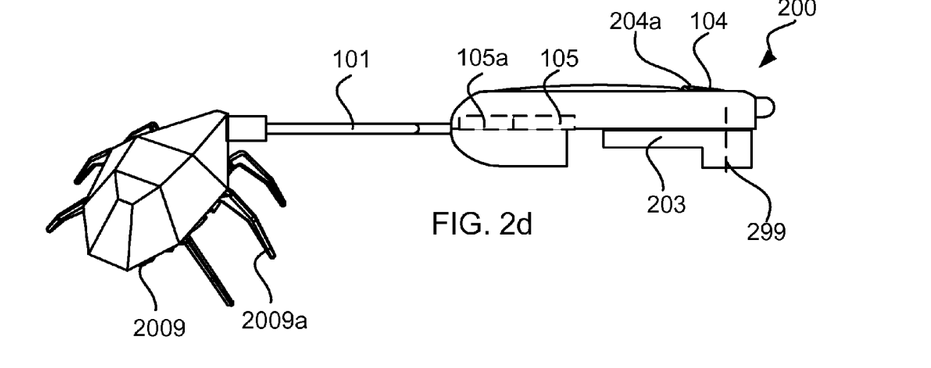
FIG. 2d illustrates the toy remote controller and recharger in accordance with the second embodiment of the invention from a side view and being coupled with a toy item and with the retractable connector in the retracted position.

A retractable connector 203 is disposed about a pivot axis 299 for extending past the outside surface 200b of the housing using a pivoting motion, such as is shown in a transition of the retractable connector from FIG. 2a to FIG. 2b, in a second state and the retractable connector 203 is for being retracted approximately within the housing 200a in a first state (FIG. 2a), wherein the retractable connector 203 comprises at least two contacts 203a and 203b where in the second state the retractable connector 203 at least two contacts 203a and 203b are for coupling the USB port 110 (FIG. 1f) for having electrical power provided from the USB port 110 to the at least two contacts 203a and 203b. A user input device 104, in the form of a variable resistor 204a, extends past an outside surface 200b of the housing 200a and a control circuit 105 coupled with the at least two contacts 203a and 203b and with the toy charging connector 101 and the IRLED 102 and the variable resistor 204a, the control circuit 105 comprising the recharging circuit 105a, wherein in a first mode of operation the control circuit 105 is for controlling the play flow of the toy item through the playflow control wireless signal 102b (FIG. 1g), preferably through modulated light emitted from the IRLED 102, when the retractable connector 203 is in the first state. In a second mode of operation the control circuit 105 is for recharging of a toy item 2009 when the toy charging connector 101 is coupled with the toy item 2009 and the retractable connector 203 is in the second state (FIG. 2d). Referring to FIG. 2d, in this case, the toy item 2009 comprises at least a leg 2009a for responding to the play flow. For example, the play flow may include, at least one of moving of the toy item 2009 in a forwards direction, moving of the toy item 2009 a backwards direction, moving of the toy item 2009 in a right turn and moving of the toy item 2009 in a left turn.

Figure 3A:
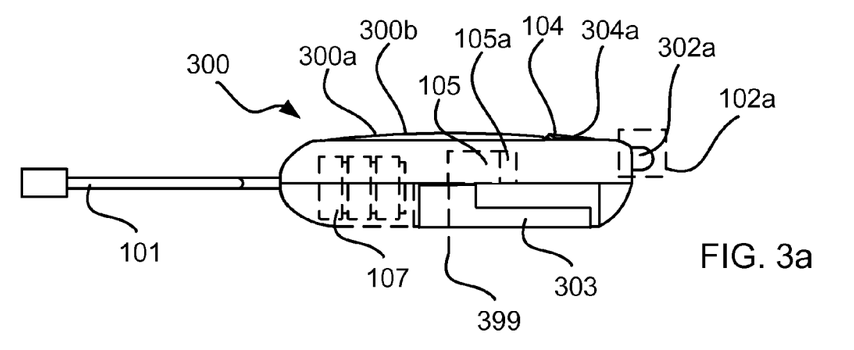
FIGS. 3a and 3b illustrate a toy remote controller and recharger in accordance with a third embodiment of the invention, where this toy remote controller and recharger is a variation of the toy remote controller and recharger shown in FIGS. 2a through 2d.
Figure 3B:
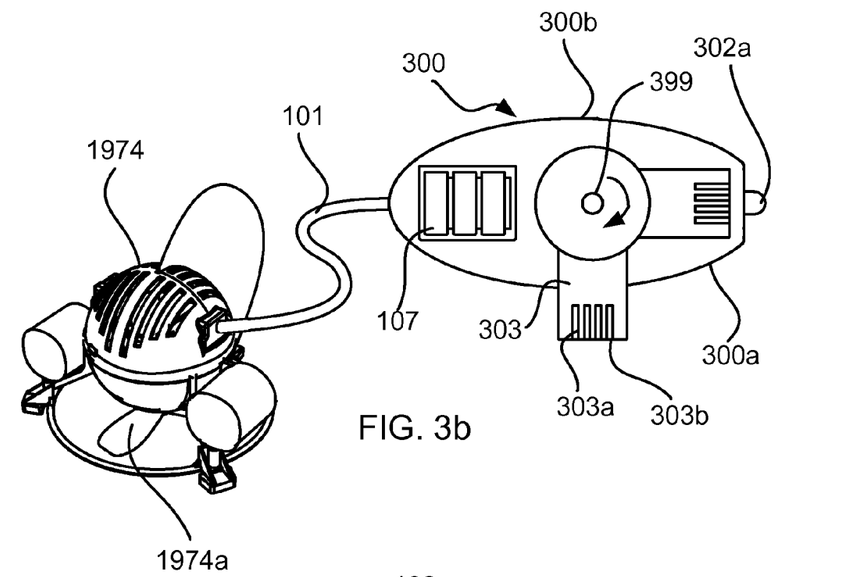

FIGS. 3a and 3b illustrate a TRCR 300 in accordance with a third embodiment of the invention. The TRCR 300 shown is a variation of the TRCR 200 shown in FIGS. 2a through 2d. The TRCR 300 is formed from a housing 300a having an outside surface 300b. A toy charging connector 101 comprising a first portion disposed within the housing 300a and a second portion extending past the outside surface 300b. A wireless transmitter 102a, in the form of a radio transmitter 302a, for emitting of the playflow control wireless signal 102b, in the form of radio waves, is provided within the housing 300a and for emitting radio waves past the outside surface 300b of the housing 300a. A retractable connector 303 is mounted to the housing 300a for pivoting about a pivot axis 399 in relation to the housing 300a for extending past the outside surface of the housing 300a (FIG. 3b) in a second state (FIG. 3b) and for retracting approximately within the housing 300a in a first state (FIG. 3a), wherein the retractable connector 303 comprises at least two contacts 303a and 303b where in the second state the retractable connector 303 at least two contacts 303a and 303b are for coupling the USB port 110 for having electrical power provided from the USB port 110 to the at least two contacts 303a and 303b. A user input device 104, in the form of a touch sensor 304a, such as a capacitive sensor as is known to those of skill in the art, and a control circuit 105 coupled with the at least two contacts 303a and 303b and with the toy charging connector 101 and the wireless transmitter 102a, the control circuit 105 comprising a recharging circuit 105a, wherein in a first mode of operation the control circuit 105 is for controlling the play flow of a toy item 1974 through radio waves emitting from the radio transmitter 302a when the retractable connector 303 is preferably in the first state. The toy item 1974 includes at least a propeller 1974a for responding to the play flow. For example, the play flow may include actuating of the at least a propeller to make the toy item 1974 hop up and down.

Figure 4A:
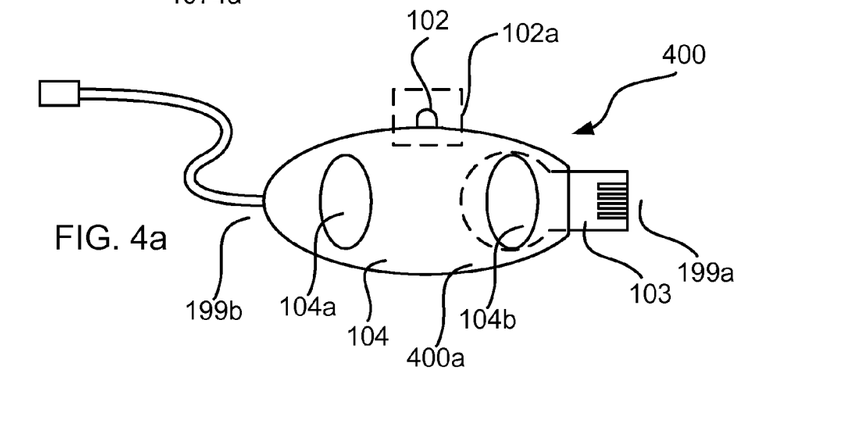
FIG. 4a illustrates a toy remote controller and recharger in accordance with a fourth embodiment of the invention, where the toy remote controller and recharger comprises two buttons; and, FIG. 5a illustrates a system that includes a toy remote controller recharger, such as the TRCR in accordance with the first embodiment of the invention, a computer and a toy item.

FIG. 4a illustrates a TRCR 400 in accordance with a fourth embodiment of the invention, where the user input device 104 includes at least a first button 104a and a second button 104b. Providing of the two buttons 104a and 104b allow the user to control the play flow of the toy item, such as item 2010, by using two hands to operate the two buttons 104a and 104b. Preferably the wireless transmitter 102a, in the form of the IRLED 102, is disposed along a length of a housing 400a, between a first end 199a and a second end 199b thereof. Being able to use two hands to operate the two buttons 104a and 104b may in some cases be advantageous in controlling of the playflow of the toy item such as the toy item 2010.

Figure 5A:
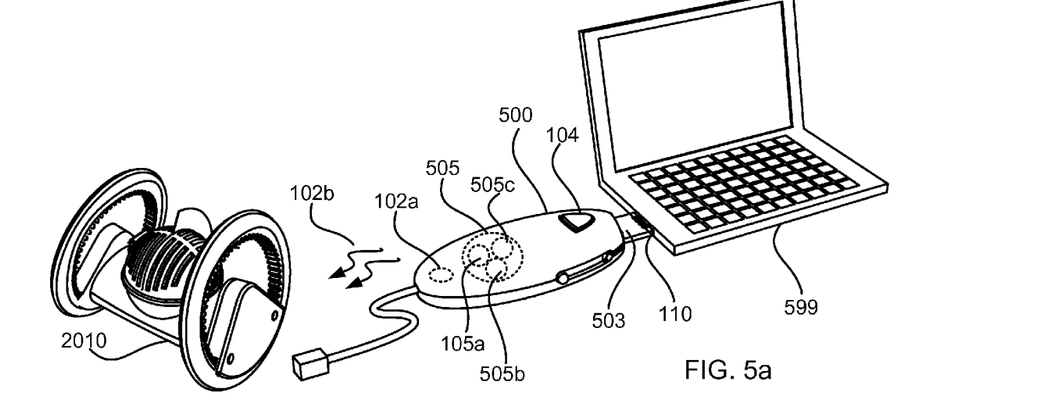
Figure 5B:
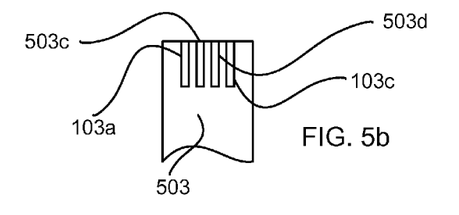
FIG. 5b illustrates close up of a retractable connector as part of the toy remote controller recharger as part of the system.

Referring to FIG. 5a, a system is shown, whereby the USB port 110 from a computer 599 is utilized for controlling the play flow of a toy item, such as toy item 2010, in the second mode of operation, through the use of a TCRC 500, which is similar to the TCRC 100 show in FIG. 1a. Referring to FIG. 5a, in this case the TCRC 500 includes a retractable connector 503, similar to the retractable connector 103, but the retractable connector 503 comprises four contacts, the four contacts comprise the at least two contacts 103a and 103b and two additional contacts 505c and 505d, which are coupled with a control circuit 505. The two additional contacts, 505c and 505d are for receiving of a play flow control data from the USB port 110 when the retractable connector 503 is in the second state and the control circuit 505 is operating in the first mode of operation for wirelessly controlling of the toy item 2010 using the playflow control wireless signal 102b, which is emitted from the wireless transmitter 102a.

The control circuit 505 includes the recharging circuit 105a and a USB integrated circuit 505a for interfacing with the USB port 110 of the computer 599. Preferably the USB integrated circuit 505b includes a unique alphanumeric identifier 505c that is specific to that USB integrated circuit 505b and from a plurality of other USB integrated circuits, there are no identical unique alphanumeric identifiers. Preferably, once the retractable connector 503 from the TCRC 500 is plugged into the USB port 110, software for execution on the computer 599 identifies the USB integrated circuit 505b and an automatic action takes place within software for execution within the computer 599, such as a specific website page is loaded. While the TRCR 500 is plugged into the USB port 110 of the computer 599, then the toy item 2010 is preferably controllable using the Internet. So for example, if the program for executing on the computer 599 recognizes the TRCR 500 and the unique alphanumeric identifier 505c, a predetermined action takes place, for example a web page is opened. Alternatively, when, for example, a Facebook™ or GMAIL™ message is received by the software for execution on the computer 599, the playflow control data 588 is generated within the computer 599 and provided to the USB port 110 and through the and two additional contacts 505c and 505d and further to the TRCR 500 so that the toy item 2010 has its play flow based on the playflow control data 588 where the playflow control wireless signal 102b is generated in dependence upon the playflow control data 588. So, for example, the toy item 2010 may turn in place when there is a Facebook™ message received by the computer 599 or perform some other action when there is a GMAIL™ message received, as is determined by the software for execution on the computer 599 for generating the playflow control data 588.

Advantageously, in accordance with the embodiments of the invention, the TRCR is used for both controlling of the toy item as well as recharging of the toy item. It therefore allows for having a compact remote controller and a reduced amount of accessories that are shipped with the toy item upon purchase. Further advantageously, by optionally providing of rechargeable batteries within the controller, it allows for the rechargeable batteries within the controller to be recharged when the toy item is being recharged. This reduces the need to utilize alkaline batteries and provides for a more environmentally friendly toy item.

Further advantageously, the control circuit also features a power saving mode of operation whereby holding down of buttons on the TRCR in order to send infrared codes to the toy item is not required, only a single push of the button is required in order to make the toy item to perform an action in accordance with controlling of the playflow of the toy item. Additionally, the TRCR also facilitates controlling of the playflow of the toy item using the Internet and creates a link between a physical item and a virtual world of the Internet through allowing of controlling of the playflow of the toy item through the playflow control data 588.

Within the aforementioned description, a USB port is mentioned, but it does not necessarily need to be a USB port and can be another type of port, for example a firewire port, or some other type of serial port that facilitates provision of power therefrom. As is known to those of skill in the art, a USB port is one of the most common ports on a computer, as well, USB rechargers are also very common.

Numerous other embodiments may be envisaged without departing from the spirit or scope of the invention.

What is claimed is:

1. A remote controller and recharger for remote controlling and for use in recharging of a toy item, the remote controller and recharger comprising:

a housing (100a, 200a, 300a, 400a) comprising an outside surface (100b, 200b, 300b);

a toy charging connector (101) for connecting to the toy item and comprising a first portion (101a) disposed within the housing and a second portion (101b) extending past the outside surface (100b, 200b, 300b);

a wireless transmitter (102a) for transmitting a playflow control wireless signal (102b) past the outside surface (100b, 200b, 300b) of the housing (100a, 200a, 300a, 400a);

a retractable connector (103, 203, 303, 503) comprising at least two contacts (103a, 103b) and movable between a retracted state and an extended state for extending past the outside surface (100b, 200b, 300b) of the housing (100a, 200a, 300a, 400a), wherein in the extended state, the at least two contacts (103a, 103b) of the retractable connector (103) are for engaging a USB port (110) for having electrical power provided from the USB port (110) to the at least two contacts (103a, 103b);

a user input device (104) for at least one of extending past the outside surface (100b, 200b, 300b) of the housing (100a, 200a, 300a, 400a) and disposed within the housing (100a, 200a, 300a, 400a) for receiving input from the user; and a control circuit (105) coupled with the at least two contacts (103a, 103b) and with the toy charging connector (101) and the wireless transmitter (102a) and the user input device (104), the control circuit (105) comprising a recharging circuit (105a), wherein in a first mode of operation the control circuit (105) is for controlling a playflow of the toy item (2010) through transmitting the playflow control wireless signal (102b) from the wireless transmitter (102a) and in a second mode of operation the control circuit (105) is for recharging the toy item (2010) through electrical power provided from the USB port (110) when the toy charging connector (101) is coupled with the toy item (2010, 2009, 1974) and the retractable connector (103, 203, 303, 503) is in the extended state.

2. A remote controller and recharger according to claim 1 wherein the wireless transmitter (102a) comprises at least one of an infrared light emitting diode (102) for emitting modulated light and a radio transmitter (302a) for emitting radio waves.

3. A remote controller and recharger according to claim 2 comprising a pivot axis (299, 399), wherein the retractable connector (203, 303) is for extending past the outside surface (200b, 300b) of the housing (200a, 300a) using a pivoting motion in the extended state and for being retracted approximately within the housing (200a, 300a) in the retracted state.

4. A remote controller and recharger according to claim 2 wherein the user input device (104) comprises a first button (104a) coupled with the control circuit (105), wherein the modulated light emitted from the light emitting diode (102) comprises a first set of optical signals upon pressing the first button (104a).

5. A remote controller and recharger according to claim 1 comprises one of a rechargeable battery (106) and a battery (108) disposed with the housing (100a, 200a, 300a, 400a) and coupled with the control circuit (105), wherein in the second mode of operation, the electrical power provided from the USB port (110) is for at least one of recharging the rechargeable battery (106) and for providing electrical power to the control circuit (105).

6. A remote controller and recharger according to claim 1 wherein the user input device (104) comprises at least one of a touch sensor (304a) and a variable resistor (204a) and an optical sensor.

7. A remote controller and recharger according to claim 1 wherein the remote controller and recharger comprises a releasable locking mechanism (109) coupled between the retractable connector (103, 203, 303, 503) and the housing (100a, 200a, 300a, 400a), wherein the releasable locking mechanism (109) is for releasably locking the retractable connector (103, 203, 303, 503) when the retractable connector (103, 203, 303, 503) is in at least one of transitions between the retracted state and the extended state and between the extended state and the retracted state, wherein in the retracted state the retractable connector is approximately retracted within the housing (100a, 200a, 300a, 400a).

8. A remote controller and recharger according to claim 1 wherein the retractable connector (503) comprises at least four contacts, the at least four contacts comprising the at least two contacts (103a, 103b) and two additional contacts (505c, 505d) coupled with the control circuit (105), wherein the two additional contacts (505c, 505d) are for receiving a playflow control data (588) from the USB port (110) when the retractable connector (503) is in the extended state and the control circuit (105) is operating in the first mode of operation for wirelessly controlling the playflow of the toy item (2010, 2009, 1974).

9. A system comprising:
a USB port (110);
a toy item (2010, 2009, 1974) comprising a toy housing (2010b) and having a toy rechargeable battery (2010c) disposed within the toy housing (2010b) and a toy charging receptacle coupled (2010d) with the toy rechargeable battery (2010c) and a wireless receiver (2010e) for receiving a playflow control wireless signal (102b) and coupled with a toy control circuit (2010f) for controlling a playflow of the toy item (2010, 2009, 1974) in dependence upon the playflow control wireless signal (102b);
a remote controller and recharger (100, 200, 300, 400, 500) for operating in a first mode of operation for controlling the playflow of the toy item (2010, 2009, 1974) and for in a second mode of operation for recharging the toy item (2010, 2009, 1974), the remote controller and recharger (100, 200, 300, 400, 500) comprising:
a housing comprising (100a, 200a, 300a, 400a) an outside surface (100b, 200b, 300b);
a toy charging connector (101) for connecting to the toy item and comprising a first portion (101a) disposed within the housing and a second portion (101b) extending past the outside surface (100b, 200b, 300b);
a wireless transmitter (102a) for transmitting a playflow control wireless signal (102b) past the outside surface (100b, 200b, 300b) of the housing (100a, 200a, 300a, 400a), the playflow control wireless signal (102b) for being received by the wireless receiver (2010e);
a retractable connector (103, 203, 303, 503) comprising at least two contacts (103a, 103b) and movable between a retracted state and an extended state for extending past the outside surface (100b, 200b, 300b) of the housing (100a, 200a, 300a, 400a), wherein in the extended state, the at least two contacts (103a, 103b) of the retractable connector (103, 203, 303, 503) are for engaging a USB port (110) for having electrical power provided from the USB port (110) to the at least two contacts (103a, 103b);
a user input device (104) for at least one of extending past the outside surface (100b, 200b, 300b) of the housing (100a, 200a, 300a, 400a) and disposed within the housing (100a, 200a, 300a, 400a) for receiving input from the user; and
a control circuit (105) coupled with the at least two contacts (103a, 103b) and with the toy charging connector (101) and the wireless transmitter (102a) and the user input device (104), the control circuit (105) comprising a recharging circuit (105a), wherein in the first mode of operation the remote controller and recharger (100, 200, 300, 400, 500) is for controlling the playflow of the toy item (2010, 2009, 1974) through transmitting the playflow control wireless signal (102b) from the wireless transmitter (102a) for being received by the wireless receiver (2010e) and in the second mode of operation the remote controller and recharger (100, 200, 300, 400, 500) is for recharging the toy item (2010, 2009, 1974) toy rechargeable battery (2010c) through electrical power provided from the USB port (110) when the toy charging connector (101) is coupled with toy charging receptacle (2010d) and the retractable connector (103, 203, 303, 503) is in the extended state.

10. A system according to claim 9 wherein the wireless receiver (2010e) comprises an optical receiver for receiving light pulses and the wireless transmitter (102a) comprises an optical transmitter for emitting the light pulses past the outside surface of the housing, wherein the playflow of the toy item is controllable through the light pulses emitted from the optical transmitter and received by the optical receiver when the remote controller and recharger is in the first mode of operation.

11. A system according to claim 9 wherein the retractable connector (103, 203, 303, 503) comprises at least four contacts, the at least four contacts comprises the at least two contacts (103a, 103b) and two additional contacts (505c, 505d) coupled with the control circuit (105), wherein the two additional contacts (505c, 505d) are for receiving a playflow control data (588) from the USB port (110) when the retractable connector (103, 203, 303, 503) is in the extended state and the control circuit (105) is operating in the first mode of operation for wirelessly controlling the toy item (2010, 2009, 1974) in dependence upon the playflow control data (588).

12. A system according to claim 9 wherein the toy item (2010, 2009, 1974) comprises one of: a propeller (1974*a*), at least a leg (2009*a*), and at least a wheel (2010*a*).

13. A method comprising:
providing a toy remote controller and recharger (TRCR) (100, 200, 300, 400, 500) comprising a wireless transmitter (102*a*) coupled with a retractable connector (103, 203, 303, 503), a toy charging connector (101), and a user input device (104), and having a housing (100*a*, 200*a*, 300*a*, 400*a*);
coupling the TRCR (100, 200, 300, 400, 500) with the toy item (2010, 2009, 1974) via the toy charging connector (101), and coupling the retractable connector (103, 203, 303, 503) with a USB port (110);
receiving electrical power provided from the USB port (110);
recharging the toy item (2010, 2009, 1974) through the electrical power received from the USB port (110);
uncoupling the toy charging connector (101) from the toy item (2010, 2009, 1974);
wirelessly transmitting a playflow control wireless signal (102*b*) using the wireless transmitter (102*a*);
receiving the playflow control wireless signal (102*b*) by the toy item (2010, 2009, 1974); and
controlling a playflow of the toy item (2010, 2009, 1974) through the received playflow control wireless signal (102*b*) by the toy item (2010, 2009, 1974).

14. A method according to claim 13 wherein the playflow comprises at least one of: moving the toy item (2010, 2009, 1974) in a forwards direction, moving the toy item (2010, 2009, 1974) in a backwards direction, moving the toy item (2010, 2009, 1974) in a right turn, and moving the toy item (2010, 2009, 1974) in a left turn.

15. A method according to claim 14 comprising:
receiving input from a user by the user input device (104) to change the playflow control wireless signal (102*b*); and
changing the playflow of the toy item (2010, 2009, 1974).

16. A method according to claim 15 comprising: uncoupling the retractable connector (103, 203, 303, 503) from the USB port (110).

17. A method according to claim 13 wherein coupling the retractable connector (103, 203, 303, 503) with a USB port (110) comprises extending the retractable connector (103, 203, 303, 503) in relation to the housing (100*a*, 200*a*, 300*a*, 400*a*).

18. A method according to claim 13 comprising:
receiving a playflow control data (588) from the USB port (110);
generating the playflow control wireless signal (102*b*) in dependence upon the playflow control data (588); and
controlling the playflow of the toy item (2010, 2009, 1974) in dependence upon the received playflow control wireless signal (102*b*).

19. A method according to claim 18 comprising:
providing a computer (599);
providing software for execution on the computer (599); and
generating the playflow control data (588) by using the software for execution on the computer (599).

20. A method according to claim 13 comprising: providing a rechargeable battery (106) disposed within the TRCR (100, 200, 300, 400, 500) and coupled with the wireless transmitter (102*a*) and wherein recharging comprises recharging the rechargeable battery (106) from electrical power received from the USB port (110).

* * * * *